Oct. 10, 1933.   A. I. MARCUM   1,930,207
ROAD VEHICLE CONSTRUCTION
Original Filed April 5, 1926
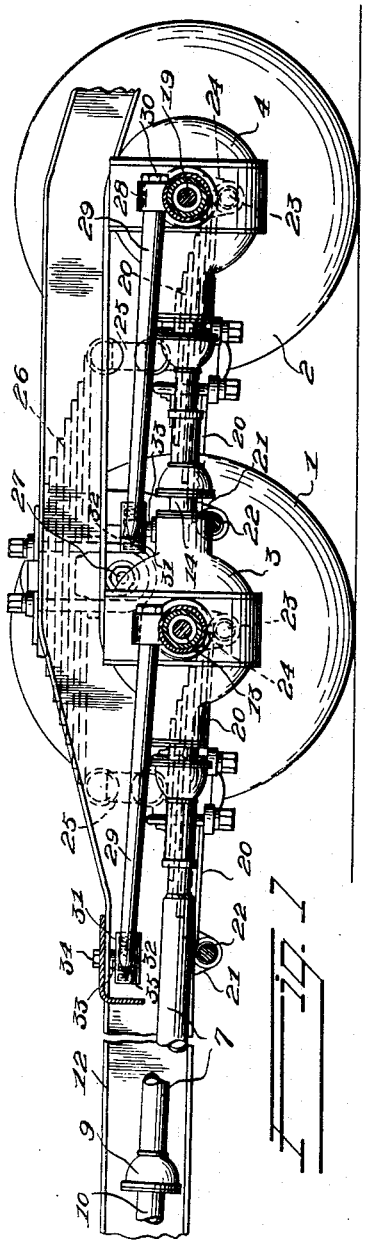
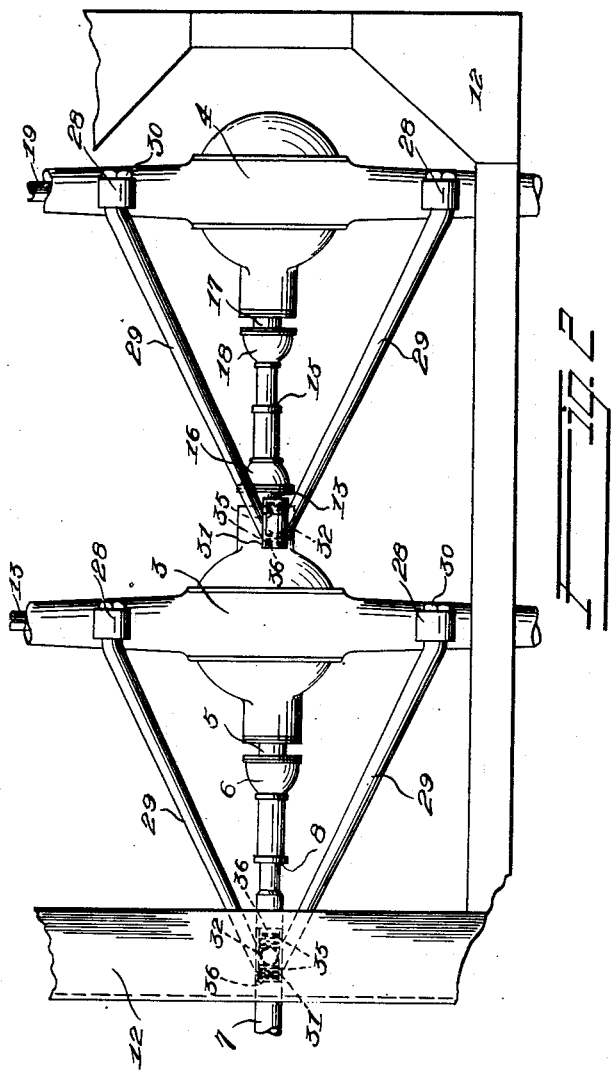
Inventor
Arthur I. Marcum
By Strauch & Hoffman
Attorneys

Patented Oct. 10, 1933

1,930,207

UNITED STATES PATENT OFFICE 1,930,207

ROAD VEHICLE CONSTRUCTION

Arthur I. Marcum, Oakland, Calif., assignor, by mesne assignments, to Automotive Engineering Corporation, a corporation of Delaware Original application April 5, 1926, Serial No. 99,831. Divided and this application September 7, 1929. Serial No. 390,941

5 Claims. (Cl. 180—22)

The present invention relates to improvements in torquing and drive arrangements for multiple wheel road vehicles, and is divided out of my co-pending application, Ser. No. 99,831, filed April 5th, 1926.

More particularly the invention relates to improvements in road vehicles with more than two supporting axles, with the supporting axles arranged in tandem or pairs. As is now well known to provide successful road vehicles with tandem drive axles, it is essential to permit the axles to move freely with relation to the frame of the vehicle in a manner that will not substantially restrict the deflections of the springs as the wheels pass over road irregularities, so that the road shocks are absorbed by the springs without transmission from one tandem axle to the other, or to the frame, otherwise than through the deflecting springs. At the same time the tendency for the axle housings to rotate about the wheel centers due to the driving and braking torque reactions must be resisted. In my co-pending application filed September 4, 1925, Serial Number 54,560, I have shown a multi-wheel road vehicle in which the necessary flexibility, spring deflections and axle movements for successful road vehicles are permitted, and the present invention provides a rear end construction, which may in practice be substituted for the rear end construction disclosed in my co-pending application. In my above mentioned co-pending application, the torque reactions are resisted by an expansible and contractible torque tube construction which interconnects parallel drive axle housings substantially at their centers permitting the necessary vertical rotary movements of the axles with relation to the frame without setting up strains in the torquing connections or restricting the flexibility of the springs.

Other torquing arrangements have been proposed in which the torque reactions have been transmitted to the frame or to the axles through torque arms secured to the axle housings at points substantially removed from the center of the vehicle. In torquing arrangements of this kind, the torque reactions set up relatively great torsional strains in the housing because of the distance from the center of the housing at which the torque is resisted. The arrangement of torquing arms substantially off the center of the axle housing restricts the vertical rotary movements of the axles, the flexibility of the spring suspensions, and axles which limit the life thereof.

In the torquing arrangements such as shown in my co-pending application in which the torque is resisted independently of the frame, a force couple is set up by the driving torque reactions which tends to raise the forward axle of a pair of driving axles and to rotate the forward axle about the rear axle reducing the traction of the forward axle. When a compensated drive is utilized with a differential mechanism between the driving differentials for the forward and rear axle shafts under slippery road conditions and when heavy driving torque is utilized, complete loss of traction may result due to slipping of the forward wheels.

Accordingly, a primary object of the present invention is to provide improved torque resisting interconnections between tandem drive axles in which the flexibility of the spring suspensions and axle movement is not substantially restricted by the torquing interconnections, and at the same time the tendency to raise the forward axle of the pair is minimized.

Another major object of the invention is to provide torquing arrangements for tandem drive axles in which the torque reactions of the rear driving axles are transmitted to the housing of the forward drive axle in a manner to resist the torque reactions of the forward driving axle, and in which the unbalanced torque reactions of the forward driving axle and the tendency to raise the forward axle is resisted on the frame of the vehicle.

Still further objects of the invention are such as may be attained by utilization of the various combinations, subcombinations and principles hereinafter more fully disclosed and as defined by the terms of the appended claims.

Referring to the drawing:

Fig. 1 is a sectional side elevation, with parts broken away, of a preferred embodiment of the invention.

Fig. 2 is a fragmental plan view showing the essential elements of the apparatus of Fig. 1.

With reference to the drawing, the intermediate driving wheels 1 and the rear driving wheels 2 support and are driven by the axles 3 and 4. The axle 3 is preferably a through driven axle such, for example, as is shown in my Patent #1,670,119, granted May 15th, 1928, in which a compensating differential mechanism is driven by the propeller shaft 5, which in turn is driven through the universal joint connection 6 by a propeller shaft 7. The latter shaft is provided with a telescoping splined coupling 8 and the forward end thereof is driven through a universal joint connection 9 by a propeller shaft section 10. Section 10 is preferably supported by a frame-carried bearing in the manner shown in my copending application, Ser. No. 54,560, filed September 4th, 1925. As will more fully appear from an inspection of said Patent #1,670,119, the compensating differential in the axle 3 divides the power from the shaft 5, between the axle shafts 13, which drive the intermediate wheels 1, and the through drive shaft section 14. Section 14 drives a telescoping shaft 15 through a universal joint 16, and shaft 15 has a universal driving connection 17 with a propeller shaft section 18, which latter supplies the driving power to the rear axle shafts 19.

A chassis frame 12 may be supported on the axles 3 and 4 by means of any type of spring suspension but, as indicated in the drawing, a compensating spring suspension is preferably utilized in order to provide proper flexibility and to secure uniform load distribution upon the driven wheels.

The spring suspension shown comprises a pair of spring beams 20 having their front ends pivotally connected to the frame by means of brackets 21 and pins 22, and their rear ends are connected by pivot pins 23 to suitable lugs 24 depending from the axles 3 and 4. The spring beams 20 are connected at their midportions, by means of pivoted shackles 25, to the ends of an equalizing spring beam 26, which latter is pivotally supported from the frame as at 27.

Provided on the axle housings 3 and 4 adjacent the centers thereof are sets of upstanding lugs 28. These lugs are provided with holes through which the ends of the torque resisting arms 29 extend to threadedly receive the securing nuts 30. The arms 29 of each set merge at their forward ends into a hollow cylindrical section 31. The effective length of each of these torque resisting devices is substantially equal in length to that of the spring beam 20 over which it is superposed. Spaced directly above each spring pivot 22, at substantially the same distance as the center of each lug 28 is vertically spaced from the corresponding spring pivot 23, is a ball head 32 mounted on a stem 33. The forward stem 33 is connected directly to the frame in an inverted manner as at 34, and the rear stem 33 is secured in an upright position upon axle housing 3. The balls 32 project into the bores of cylindrical sections 31 wherein they freely and reciprocatingly fit and are normally maintained in a central position by the opposing action of pairs of helical springs 35. The springs of each pair have their inner ends seated on a corresponding ball 32 and their outer ends abutting plugs 36 which close the ends of the bore of the cylindrical section 31.

In the operation of the apparatus above described, as the vehicle is driven and passes over road irregularities, the axle housings 3 and 4 will tend to rotate clockwise, due to the driving reaction. The torque reactions on the axle housing 4 are transmitted through arms 29 and section 31 against the ball 32, tending to rotate axle housing 3 counter-clockwise and thus to neutralize the driving torque of the forward axle. The tendency for housing 3 to rotate is further resisted by the forward torque arms 29 and their connection directly to the chassis frame.

The cylindrical sections 31 being free to move longitudinally and universally with respect to the balls 32, they will permit free up and down movement of the wheels and axles as the vehicle passes over road irregularities without restricting the deflections of the springs. At the same time, the tendency of the axle housings to rotate about the rear wheel centers is resisted without setting up a substantial force couple that would tend to swing the front axle upward with respect to the rear axle.

It will be observed that the arms 29, which minimize rotation of the axle housings, are arranged in parallelism with their respective spring beams 20 during normal operation and are designed to have substantially the same effective lengths as said respective spring beams. This results in an approximately parallel motion of the axes of the axles as they move with relation to the frame under normal road conditions. This substantially parallel motion is further made possible by the fact that the distance between the balls 32 and the lugs 28 varies mainly in accordance with spring deflections. This compensation (change in distance) for spring deflections (change in lengths of spring beams 20) is permitted by the helical springs 35 which contract and expand to permit sections 31 to move with respect to balls 32. The springs 35 also help to absorb shocks as they yield to prevent restriction of the flexibility of the spring beams.

What I claim is:—

1. In a multi-wheel road vehicle, a frame; a pair of tandem axles, at least one of which is driven, disposed at one end of said frame; and a suspension system for mounting said one end of the frame upon said axles; said suspension system comprising a pair of parallel beams of substantially equal length each being longitudinally arranged with one end connected to one of the axles and its end pivotally mounted on the frame, a third beam pivotally connected between the other axles and the frame to assist in positioning the latter, and a fourth beam of substantially the same length as said third beam and disposed in a horizontal plane vertically spaced from that of the third beam, said fourth beam being connected between the axles, and means yieldingly resisting bodily upward movement of said beams and axles relative to the frame.

2. In a motor vehicle, the combination with a chassis, two rear axle housings supporting the chassis entirely from points beneath the axes of the housings and a set of rear drive wheels supporting the ends of the housings, of means for causing the wheels to move upwardly and downwardly relative to each other without changing the distribution of load as between the same as the vehicle travels over uneven ground, and separate means comprising longitudinally arranged devices pivotally interconnecting the axle housings and pivotally interconnecting the forward axle housing and the chassis frame, for resisting the driving torque reactions of said housings during operation of the vehicle, one end of each of said devices including resilient means for permitting changes in their effective lengths as the wheels move up and down in passing over road irregularities.

3. In a multi-wheel road vehicle, a frame; a pair of tandem axles, at least one of which is driven, disposed at one end of said frame; and mechanism for mounting and positioning the frame end upon said axles; said mechanism comprising a pair of parallel vertically offset arms of substantially equal effective lengths, each being longitudinally arranged with one end pivotally connected to the frame and its other end connected to one of the axles, a torque arm connected between said axles, and means yieldingly resisting bodily upward movement of said axles and arms relative to the frame.

4. In the apparatus defined in claim 3, one of said pair of arms, and said torque arm, having their axes disposed substantially along the longitudinal center line of the frame, whereby they create no undesirable interference with the axle movements during operation.

5. In a multi-wheel road vehicle, a frame; a pair of tandem axles, at least one of which is driven, disposed at one end of said frame; and mechanism for mounting and positioning the frame end upon the axles; said mechanism comprising a pair of longitudinally arranged arms at opposed sides of the frame, connected to the ends of one axle and projecting into pivotal connection with the frame at points spaced away from the pair of axles, a third arm of substantially the same length as said pair of arms and offset in a horizontal plane vertically spaced from the latter, said third arm being non-rotatively connected to said one axle and pivotally connected to the frame centrally of the latter, means for positioning the other axle in relatively closely spaced relation to said one axle, and means yieldingly resisting downward movement of said frame toward said axles.

ARTHUR I. MARCUM.